United States Patent [19]

Herrington

[11] 4,443,400
[45] Apr. 17, 1984

[54] METHOD AND APPARATUS FOR THE FORMATION OF PROFILED THERMOPLASTIC FILM

[75] Inventor: F. John Herrington, Holcomb, N.Y.
[73] Assignee: Mobil Oil Corporation, New York, N.Y.
[21] Appl. No.: 407,206
[22] Filed: Aug. 11, 1982
[51] Int. Cl.³ .............................................. B29C 25/00
[52] U.S. Cl. .................................... 264/519; 264/569; 425/72 R; 425/326.1
[58] Field of Search ............. 264/569, 519; 425/72 R, 425/326.1

[56] References Cited

U.S. PATENT DOCUMENTS

| | | | |
|---|---|---|---|
| 2,926,384 | 3/1960 | Hertz et al. | 425/72 R |
| 2,952,874 | 9/1960 | Doyle | 425/72 R |
| 3,835,209 | 9/1974 | Karabedian | 425/326.1 |
| 3,852,386 | 6/1980 | Behr | 264/40 |
| 4,209,475 | 12/1974 | Herrington | 264/40.1 |
| 4,229,407 | 10/1980 | Craig | 264/519 |
| 4,265,853 | 5/1981 | Havens | 264/519 |
| 4,330,501 | 5/1982 | Jones et al. | 264/569 |

FOREIGN PATENT DOCUMENTS

| | | | |
|---|---|---|---|
| 2658518 | 6/1978 | Fed. Rep. of Germany | 264/569 |
| 51-5021 | 2/1976 | Japan | 264/569 |
| 1233588 | 5/1971 | United Kingdom | 264/519 |
| 1236831 | 6/1971 | United Kingdom | |
| 1250945 | 10/1971 | United Kingdom | |
| 1529222 | 10/1978 | United Kingdom | 425/72 R |
| 440038 | 3/1975 | U.S.S.R. | 425/72 R |

*Primary Examiner*—Jeffery R. Thurlow
*Attorney, Agent, or Firm*—A. J. McKillop; M. G. Gilman; J. F. Powers, Jr.

[57] ABSTRACT

A method and apparatus for the formation of a continuous web of a tubular thermoplastic film from an extrudate of a thermoplastic polymeric material or resin, wherein the thermoplastic film has a profiled wall contour extending in the direction of the longitudinal axis of the film. The apparatus for forming a profiled tubular thermoplastic film, and the method which is implemented through the intermediary of the apparatus, provides for an annular cooling ring extending about the extrusion die orifice and which incorporates a central aperture through which the extruded plastic material is conveyed while still in a molten or heat-plastified state, and is adapted to direct a uniformly distributed flow of a cooling medium, such as air, against the circumferential surface of the extruded tubular plastic film material. A secondary or bypass flow of the cooling medium is directed from the cooling ring, prior to the primary cooling medium flow against the surface of the extruded material, so as to impinge against one or more peripherally spaced zones on the film in order to impart local cooling to the extruded film material within each such zone, to thereby cause the formation of a thickened film wall section or profile extending in the longitudinal direction of the formed tubular thermoplastic film. In order to control the cooling rate of the cooling ring, the cooling ring incorporates an adjusting device which will vary the extent of the cooling medium flow which is uniformly provided about the periphery of the extruded thermoplastic material and, additionally, includes a metering arrangement which will modify or even completely inhibit the cooling medium flow through the bypass so as to thereby control the extent of the profiling of the film. Both the uniform and local flows of the cooling medium within the cooling ring may be supplied with the cooling medium from a plenum encasing the cooling ring, and which is supplied from a single cooling medium source.

17 Claims, 7 Drawing Figures 4,443,400

METHOD AND APPARATUS FOR THE FORMATION OF PROFILED THERMOPLASTIC FILM

BACKGROUND OF THE INVENTION

1. Field of the Invention

The present invention relates to a method and apparatus for the formation of a continuous web of a tubular thermoplastic film from an extrudate of a thermoplastic polymeric material or resin and, more particularly, relates to the formation of a thermoplastic film having a profiled wall contour extending in the direction of the longitudinal axis of the film.

The formation of thermoplastic tubular film through the extrusion of molten thermoplastic polymeric materials wherein the materials are conducted through an annular extrusion die orifice, employed for the manufacture of film, tubing, pipes and the like, is well known in the plastics extrusion technology. In order to regulate the rate of cooling and solidification of the extrudate, it has frequently been found desirable to contact the surface of the molten or still heat-plastified thermoplastic material, upon leaving the extrusion die orifice, with a stream of a suitable cooling medium and, as a result, to control the properties and physical configuration of the finished extruded product.

Various commercial products, for example, such as the extensively sold sandwich bags which are formed from a thermoplastic film material, require material thicknesses which must be heavier towards the top or opening of the bag where they are normally gripped and handled by a user in order to minimize tearing of the film and to concurrently make the bag feel thick and of high strength and quality to a user. It is not necessary to provide a heavy gauge of film in the body of the bag where it is rarely handled and wherein a very low mechanical stress is developed. Consequently, a concept has been developed which is designed to effect substantial savings in the required quantities of polymeric material or resin without sacrificing performance of the finished product by profiling the film thickness upon extrusion of the polymeric resin or material so as to provide the desired film thickness at the top of the bag while allowing for a thinner film thickness in the body of the bag, so that the average film thickness is, in fact, much thinner than that which is felt and observed by the user of the bag.

2. Discussion of the Prior Art

Heretofore, various kinds of methods and apparatus have been proposed with regard to manufacturing techniques in the formation of thermoplastic film possessing profiled thicknesses; nevertheless, none of these have proven themselves in actual practice to be completely satisfactory in affording the desired degree of control in the formation of extruded profiled thermoplastic film.

Behr U.S. Pat. No. 3,852,386 discloses the production of an extruded plastic tubular film having circumferentially spaced thickened film sections or profiles extending continuously in the axial direction of the film. These sections are adapted to interlock mechanically with each other so as to constitute a zipper-like fastener integrally formed with the film. The profiled sections in the film are formed through the provision of different rates of cooling after the film has been extruded from an annular die subsequent to the expansion of the tubular film, but while the film is in a still hot state. As may be clearly ascertained, the formation of the profiled sections in the film wall is effected in a region having been subjected to primary cooling and inflating of the film, in which such profiling is rather difficult to achieve in any satisfactorily controlled manner. Consequently, the apparatus and method disclosed in this patent is bounded by extensive restrictions in the formation of precise profiled wall sections in extruded thermoplastic films.

Similarly, interrelated British Patent Nos. 1,250,945 and 1,236,831 each disclose processes for the production of tubular thermoplastic film which includes at least one longitudinal zone wherein the wall thickness of the film is heavier than the thickness of the remainder of the film, and also describes the formation of bags with that process. In each of the British patents, the selective cooling of the extruded film is effected subsequent to the primary cooling and inflating of the tubular plastic film, which renders the formation of controlled profiled wall structure extensively difficult, if not completely impossible.

More recently an apparatus and method has been developed, as disclosed in Herrington U.S. Pat. No. 4,209,475, which describes an apparatus for adjusting a cooling medium air flow from a cooling ring encompassing an extrusion die orifice so as to cool more extensively in selected regions of the film. The patented apparatus provides for a large number of adjustable deflector blades which are circumferentially arranged about the extrusion die orifice of the apparatus, and are basically designed to provide adjustment so as to compensate for errors or irregularities in the thickness of the plastic film produced by the extrusion die. Conceivably, the apparatus can be employed in producing a variation in the film thickness when the extrusion die is of a precise configuration and, upon effecting displacement of the deflector blades, is capable of producing extruded thermoplastic tubular film with a profiled thickness. However, the apparatus operates with relatively high air cooling speeds and flow rates and is not designed to provide a controlled profiled tubular film in a manner utilizing relatively low air cooling flow speeds and rates as is contemplated by the inventive method and apparatus.

Basically, in accordance with the inventive concept, when forming extruded tubular thermoplastic film which is intended to be utilized in the formation of sandwich bag film, the cooling speed or rate is considerably lower than that employed with usual tubular plastic film extrusion processes, so that the amount of cooling air which leaves the air ring is relatively small. Consequently, there is necessitated the application of a different process and apparatus which will provide for the selective or localized cooling of the extruded tubular plastic film at a location in which the thermoplastic polymeric material or resin in the primary stage of forming the film is still in a molten or heat-plastified condition, and in which a separate flow of a cooling medium is directed against the extrudate at specific regions or zones about the periphery of the tubular film material being extruded so as to form one or more profiled film regions.

SUMMARY OF THE INVENTION

Essentially, the apparatus for forming a profiled tubular thermoplastic film, and the method which is implemented through the intermediary of the apparatus, contemplates the provision of an annular cooling ring extending about the extrusion die orifice and which incorporates a central aperture through which the extruded plastic material is conveyed while still in a molten or heat-plastified state, and which is adapted to direct a uniformly distributed flow of a cooling medium, such as air, against the circumferential surface of the extruded tubular plastic film material, which flow, if desired, may be at a relative low speed and rate of air flow. A secondary or bypass flow of the cooling medium is directed from the cooling ring, prior to the primary cooling medium flow against the surface of the extruded material, so as to impinge against one or more peripherally spaced zones on the film in order to impart local cooling to the extruded film material within each such zone, to thereby cause the formation of a thickened film wall section or profile extending in the longitudinal direction of the formed tubular thermoplastic film. In order to control the cooling rate of the cooling ring, the cooling ring incorporates an adjusting device which will vary the extent of the cooling medium flow which is uniformly provided about the periphery of the extruded thermoplastic material and, additionally, includes a metering arrangement which will modify or even completely inhibit the cooling medium flow through the bypass so as to thereby control the extent of the profiling of the film. Both the uniform and local flows of the cooling medium within the cooling ring may be supplied from a plenum encasing the cooling ring, and which is supplied from a single cooling medium source.

Accordingly, it is a primary object of the present invention to provide a method for forming a profiled tubular thermoplastic film obtained through the selective localized cooling of a continuously extruded thermoplastic polymeric material.

It is a more specific object of the present invention to provide a method as described hereinabove wherein local cooling is imparted to an extruded thermoplastic tubular film material while the film is in a still molten or heat-plastified state subsequent to extrusion from an annular extrusion die.

Still another object of the present invention is to provide for a method of forming a profiled tubular thermoplastic film wherein a cooling medium, such as air, is directed at one or more localized zones spaced about the periphery of the film as it is being extruded from an annular extrusion die and while the film still is in a molten or heat-plastified condition, and in which the film is subsequently subjected to a uniformly distributed cooling air flow about the periphery of the film so as to, in a controlled manner, form a precisely profiled tubular thermoplastic film.

A further object of the present invention resides in the provision of an apparatus for implementing the method as described hereinabove, wherein a cooling medium is supplied from a plenum so as to be uniformly distributed throughout a cooling ring, the latter of which is adapted to concurrently convey the cooling medium to localized zones on the surface of thermoplastic tubular film being extruded through an annular extrusion die orifice and while the film is in a still molten or heat-plastified condition, and subsequently to impart a uniformly distributed cooling medium flow directed against the periphery of the extruded thermoplastic film so as to form a profiled wall contour on the film which extends in the longitudinal direction thereof.

A still further object of the present invention is to provide an apparatus of the type described hereinabove, in which the cooling ring is adapted to provide for adjustment in the flow of the cooling medium flow which is uniformly distributed about the periphery of the extruded thermoplastic film, and including an arrangement whereby the amount of the bypass flow of cooling medium to the localized zones of the tubular film is adapted to be metered so as to allow for the formation of a controlled profiled contour in the extruded thermoplastic film.

BRIEF DESCRIPTION OF THE DRAWINGS

Reference may now be had to the following detailed description of preferred embodiments of an apparatus pursuant to the invention for producing a profiled tubular thermoplastic film, taken in conjunction with the accompanying drawings; in which.

DETAILED DESCRIPTION

Although the apparatus is disclosed and described herein as relating to an upwardly extruding apparatus and cooling die arrangement for the formation of a profiled tubular plastic film, it will be readily apparent to one skilled in the art that, in lieu of the film being extruded and conveyed in an upward direction, the apparatus may be operated so as to extrude and convey the tubular thermoplastic film material in a downward direction.

Figure 1:
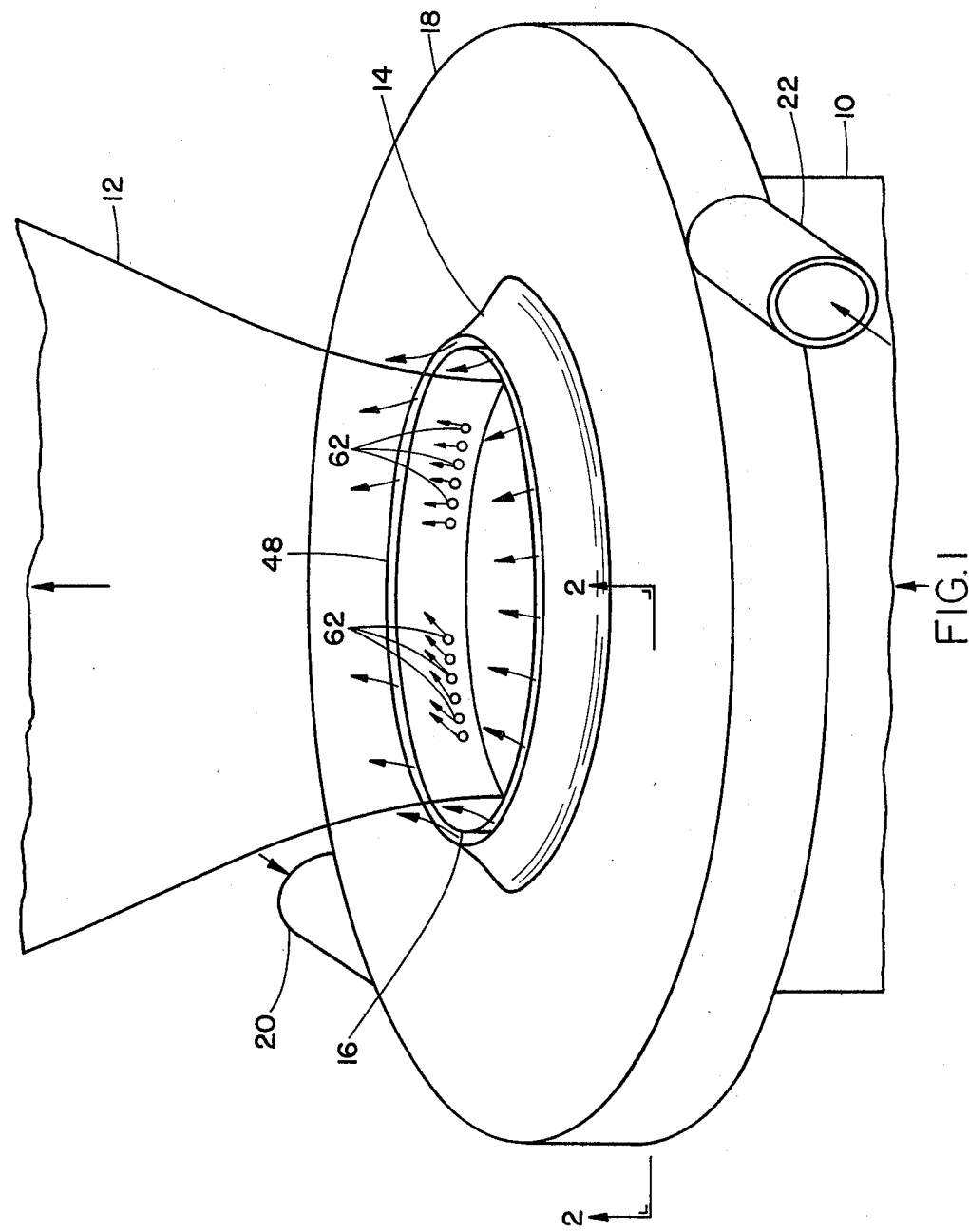
FIG. 1 illustrates, in a perspective view, a generally schematic representation of a cooling ring with an encompassing plenum chamber for supplying a cooling medium, and which is adapted to form an extruded tubular thermoplastic film having a profiled section pursuant to the invention.

Referring in particular to FIG. 1 of the drawings, there is shown apparatus including an extrusion die 10 for continuously extruding a molten thermoplastic polymeric resin or material through a standard type of annular extrusion die orifice to form a continuous thermoplastic tubular film 12. A cooling ring 14 having an annular opening 16 through which the film 12 is extruded is located immediately upstream of and about the extrusion die orifice, and is sealingly enclosed by a plenum 18 which has a cooling medium, such as air, conveyed thereto through tangentially-extending inlet ducts 20 and 22 from a suitable supply source (not shown).

Figures 2, 3:
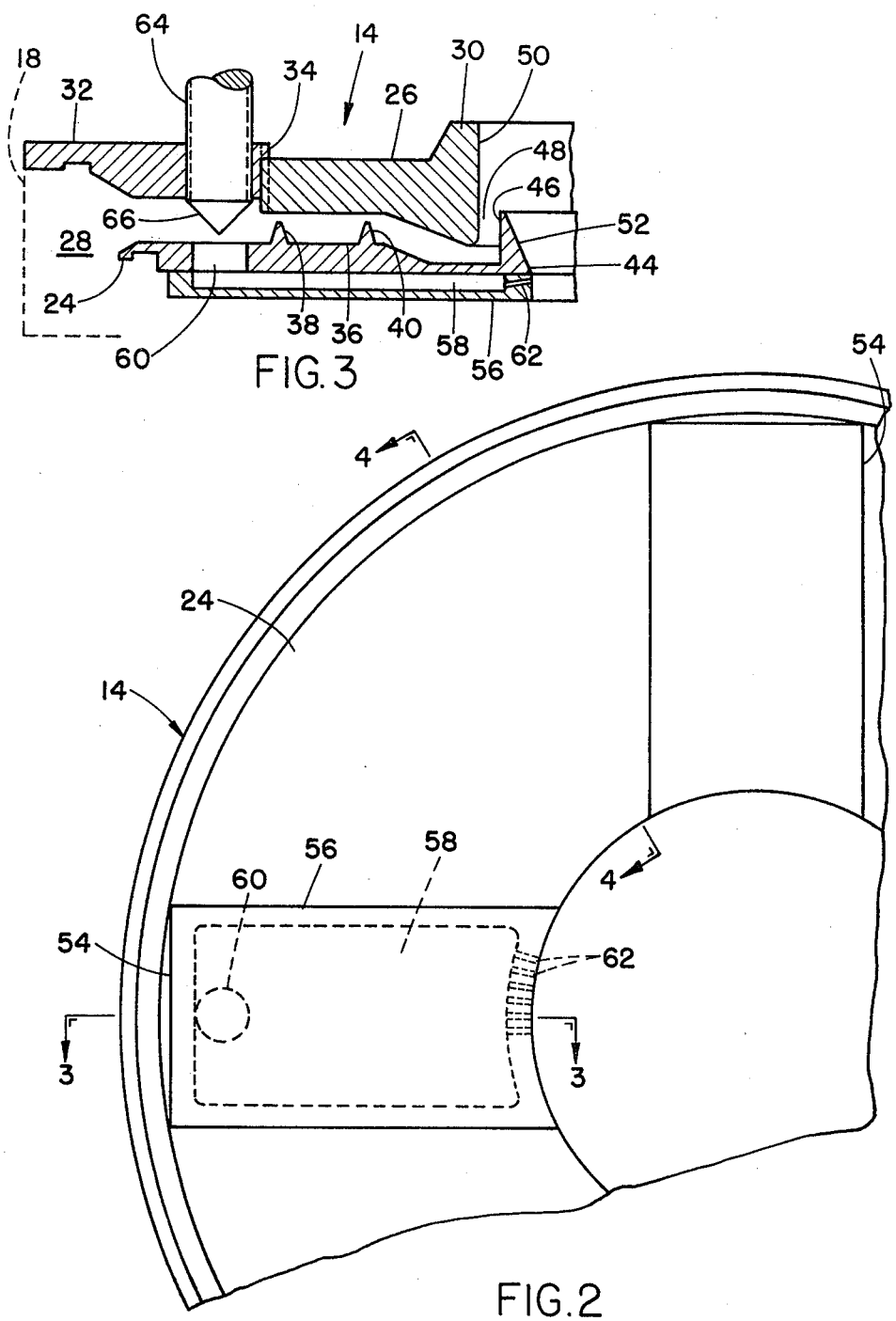
FIG. 2 shows a sectional view through the cooling ring taken along line 2—2 in FIG. 1.
FIG. 3 shows a sectional view taken along line 3—3 in FIG. 2.
Figure 4:
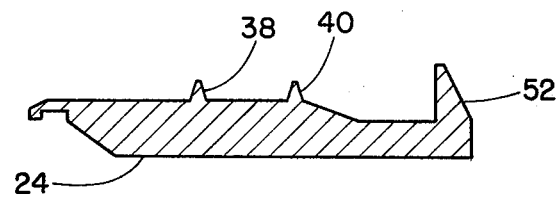
FIG. 4 shows a sectional view taken along line 4—4 in FIG. 2, illustrating one disc member of the cooling ring.

As illustrated in detail in the embodiment of the apparatus of FIGS. 2 through 4 of the drawings, the cooling ring 14 may be constituted of a first or lower circular disc member 24 and of an upper or second disc arrangement 26 being located in spaced relationship therewith so as to provide an annular passageway 28 therebetween.

The upper disc arrangement 26 includes a radially inwardly located disc portion 30 which is threadedly connected to an outer disc portion 32 by means of cooperating threads 34 so as to provide for axial displacement or adjustment between the disc portions 30 and 32.

The lower disc member 24 has a generally planar upper surface 36 facing towards the passageway 28, and which includes a pair of concentrically spaced, annular raised ribs or baffles 38, 40 which provide for flow restrictions and pressure drops in the passageway 28 between the cooling ring disc portion 30 and disc member 24. Suitable spacers (not shown) in the form of streamlined airfoils may be provided so as to interconnect disc portion 32 and disc member 24 in a fixed spatial relationship without hindering flow of cooling medium through passageway 28, whereas disc portion 30 is adapted to be adjusted towards and away from the disc member 24 by rotation between the interengaging thread portions 34 to thereby vary the gap size between the tips of baffles 38 and 40 and the lower surface 42 of disc member 30. This will provide for control over the amount of cooling medium flowing through the passageway 28 while providing a pressure drop across the baffles so as to divert a major portion of the cooling medium into bypass flow, as described hereinbelow.

The radially inner end 44 of the disc member 24 includes an upstanding peripheral wall portion 46 dimensioned to define an annular channel 48 in cooperation with the vertical peripheral end wall 50 of the disc portion 30, to facilitate axial upward flow of the cooling medium along the outer surface of the extruded tubular thermoplastic film material conducted along surface 52 of the disc member 24 and the wall surface 50.

Formed in the surface of the disc member 24 facing away from disc arrangement 26, which as is shown in FIG. 4 of the drawings, may be constructed of a solid metallic material, are essentially rectangular cutouts 54, which are adapted to receive suitable inserts for the formation of the profiled tubular plastic film wall, as is described in detail hereinbelow.

As is illustrated in FIG. 2 of the drawing, there are shown two of such cutouts 54 in the disc member 24 at an angular spacing of 90° relative to each other, although one, two or even more cutouts may, as desired, be formed in the disc member 24 depending upon the number and spacing of profiled sections required to be incorporated into the wall thickness of the extruded thermoplastic film. Each cutout 54 in the bottom of the disc member 24 is adapted to receive an insert 56 having an overall configuration in general conformance with the dimensions of the associated cutout 54, with the bottom of the insert 56 being essentially coplanar with the remaining surface of the bottom of disc member 24. Suitable fasteners, such as locking screws or the like (not shown) may be utilized to mount each insert 56 within its respective cutout 54 provided in the disc member 24.

The insert 56 is hollowed out so as to provide a generally rectangular cavity 58. A circular bore 60 located towards the radially outer end of the disc member 24 communicates the cavity 58 in the insert 56 with passageway 28 so as to facilitate the through flow of cooling medium into cavity 58 from the passageway 28. The radially inner end of the cavity 58 connects with a plurality of radially inwardly directed and upwardly sloped small bores 62 facing in an arc towards the extended film which is conveyed past the surface 52. Thus, a portion of cooling medium which is supplied to the passageway 28 from the plenum 18 flows through the passageway 28 and through the axial passageway 48, whereas the remaining flow of the cooling medium flows through the bore 60 into the cavity 58 and out through the plurality of small apertures or bores 62, the latter of which form a bypass passageway for the localized cooling of the extruded plastic material passing, and the resultant formation of the heavier or profiled wall thickness zones of the thermoplastic film.

In order to meter the amount of cooling medium flowing into the cavity 58 and out through apertures or bores 62, the disc portion 32 is provided with a vertically adjustable metering screw 64, one being provided in axial alignment with a respective bore 60, having a tapered lower end 66 which, if desired, can be screwed towards or away from the bore 60 so as to either restrict or inhibit passage of cooling medium therethrough, or to increase the flow of the cooling medium.

Figure 5:
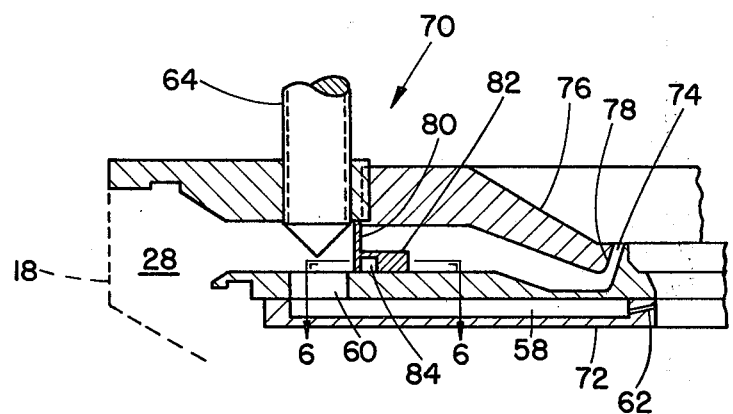
FIG. 5 is a view similar to that of FIG. 3 showing a somewhat modified embodiment of a cooling ring.
Figure 6:
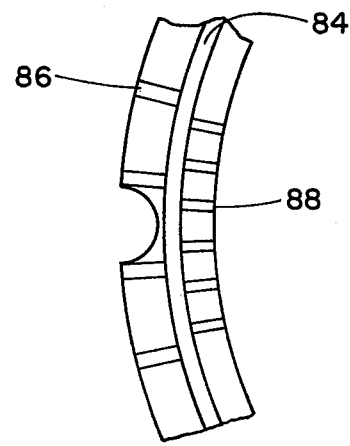
FIG. 6 is a fragmentary section taken along line 6—6 in FIG. 5.

Referring now in detail to the embodiment of the apparatus illustrated in FIGS. 5 and 6 of the drawings, the cooling ring structure 70 illustrated therein is similar in principle and operation to that of cooling ring 14 as shown in FIGS. 2 through 4, similar or identical parts being designated with the same reference numerals.

However, in this instance, the lower disc member 72 has a radially inner end wherein the passageway 74 formed in conjunction with the upper disc portion 76 is angled radially inwardly rather than merely axially upwardly as in the preceding embodiment, with the radially inner end of the upper inner disc portion 76 being tapered down so as to define a radially inwardly and upwardly sloping conical end surface 78.

Furthermore, in lieu of the two upstanding annular baffles 38 and 40 as shown in the embodiment of FIGS. 2 through 4, the passageway 28 is closed off by an annular flow restrictor ring 80, having a widened bottom portion 82. Formed within the bottom portion 82 is an annular groove 84 which communicates with the radially outer portion of passageway 28 through a series of through-bores 86 and, in turn, communicates with the passageway 74 through a larger number of smaller through-bores 88. This arrangement will provide for a pressure drop of the cooling air being distributed about the periphery of the extruded plastic material through passageway 74 as supplied to the passageway 28 from the plenum 18.

The bypass passageway which provides for the localized cooling of the surface of the thermoplastic material, as represented by insert or inserts 56, is in this embodiment analagous in construction and function with that described in connection with the previous embodiment, and need not be elucidated in detail herein.

Figure 7:
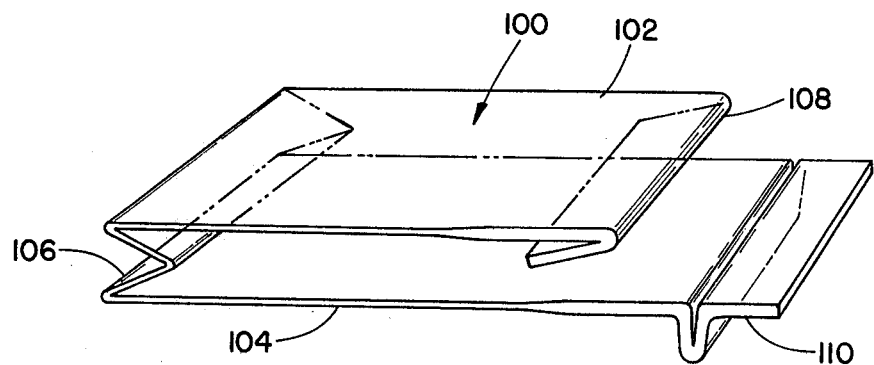
FIG. 7 is a perspective view of a plastic sandwich bag made in accordance with the present invention, with the sides of the bag shown cut open to illustrate the profiled film zones.

Referring now to the drawing in FIG. 7, this illustrates a sectional view through a plastic bag, such as a sandwich bag, which has been formed from an extruded tubular thermoplastic film having a profiled wall zones extending in the longitudinal direction of the extruded film.

Thus, a bag 100 includes a main body portion consisting of side walls 102 and 104 which are of a thinner film wall thickness, as is the gusseted bottom structure 106 of the bag. In this instance, the film of the bag body may have a thickness of about 0.9 mils. The upper ends of the bag 108 and 110 which are usually handled during use of the bag, are formed from a heavier film thickness such as, for example, 1.5 mils, which is formed along the peripheral zone or zones of the extruded tubular film in which localized cooling has been imparted to the extrudate through the bores 62 of the inserts 56, to provide for the profiling of the film. Thus, although a user will feel a heavier wall thickness of 1.5 mils when handling the bag at its opening end, in actuality the average thickness of the bag is only 1.1 mils, resulting in considerable savings of material.

From the foregoing there may be ascertained that the present invention really provides a simple and inexpensive apparatus and method of producing a profiled tubular plastic film through the localized cooling of the extruded film while the latter is still in a molten or heat-plastified state.

While there has been shown and described what are considered to be preferred embodiments of the invention it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereafter claimed.

What is claimed is:

1. A method of forming an extruded tubular thermoplastic film having at least one region of a thickened wall profile extending in the longitudinal direction of the extruded tubular film; comprising extruding a molten thermoplastic polymeric material through an annular extrusion die; and passing said extruded tubular film through a cooling zone while said film is in a heat-plastified condition including subjecting said film to selectively adjustable localized cooling in the region for forming a thickened profile of variable thickness, and subsequently subjecting said tubular film to a selective amount of uniform cooling about the periphery thereof so as to vary the thickness of said film and to form said longitudinally extending thickened profiled region in the wall of the tubular film.

2. A method as claimed in claim 1, comprising imparting said localized cooling to said extruded tubular thermoplastic film at a plurality of circumferentially spaced zones so as form a plurality of said thickened profiled regions in the film wall.

3. A method as claimed in claim 1 or 2, comprising directing a flow of a gaseous cooling medium against the outer surface of said tubular film to provide said localized cooling and the subsequent uniform cooling about the periphery of the film.

4. A method as claimed in claim 3, said gaseous cooling medium comprising air.

5. An apparatus for the forming of an extruded tubular thermoplastic film having at least one region of a thickened wall profile extending in the longitudinal direction of the extruded film, said apparatus comprising an annular extrusion die for extruding a molten thermoplastic polymeric material to form said film; a cooling ring having a central opening mounted in line with and downstream of said extrusion die wherein the extruded molten polymeric material passes through said central opening, said cooling ring including means for directing a bypass flow of a cooling medium against localized zones along the peripheral surface of said extruded material while said material is in a heat-plastified condition, means for metering the localized bypass flow of said cooling medium for forming said thickened wall profile of variable thickness, and adjustable means in said cooling ring for subsequently directing a uniformly distributed and variable flow quantity of said cooling medium against the peripheral surface of said extruded material so as to form said thickened wall profile region along the zones of said localized cooling while the material is conveyed through said cooling ring.

6. An apparatus as claimed in claim 5, comprising means for supplying said cooling medium to said cooling ring, said cooling ring including means for dividing said cooling medium into said uniformly distributed cooling medium flow about the periphery fo the extruded material and a bypass flow of said cooling medium flow to the localized zones of said extruded material.

7. An apparatus as claimed in claim 6, said cooling ring comprising spaced disc members defining an annular passageway therebetween for conducting said uniformly distributed cooling medium flow about the periphery of said extruded material.

8. An apparatus as claimed in claim 7, comprising at least one insert in one of said disc members having a recess portion communicating with said annular passageway, and a plurality of apertures formed in the insert connected to said recess and having outlets facing the surface of the extruded material so as to provide the localized cooling medium bypass flow directed against regions about the peripheral surface of the extruded material.

9. An apparatus as claimed in claim 5, said metering means comprising a metering screw for controlling the inflow of said cooling medium into the recess of said insert.

10. An apparatus as claimed in claim 7, wherein spacing between said disc members is adjustable to control the amount of flow of uniformly distributed cooling medium through said annular passageway to the periphery of said extended film.

11. An apparatus as claimed in claim 10, comprising annular baffle means projecting into said annular passageway to lower the outlet pressure of the uniformly distributed cooling medium flow through said passageway.

12. An apparatus as claimed in claim 11, said baffle means comprising a plurality of concentrically spaced ribs.

13. An apparatus as claimed in claim 5, said baffle means comprising a restrictor ring extending between said disc members, and a plurality of communicating radially offset inlet and outlet bores being formed in said restrictor ring.

14. An apparatus as claimed in claim 10, wherein one of said disc members includes a threaded annular portion which is adjustable relative to the opposite disc member so as to vary the passageway between said disc members.

15. An apparatus as claimed in claim 8, comprising a plurality of said inserts circumferentially spaced about said cooling ring to provide for a plurality of locally cooled zones about the periphery of said extruded material.

16. An apparatus as claimed in claim 6, said cooling medium supply means comprising a plenum encompassing said cooling ring for the circumferentially uniformly distributed inlet of said cooling medium.

17. An apparatus as claimed in claim 5, said cooling medium comprising air.

* * * * *